Dec. 12, 1939. F. WEGERDT 2,182,908
HYDRAULIC DRIVE FOR MACHINE TOOLS
Filed Feb. 26, 1936 7 Sheets-Sheet 1
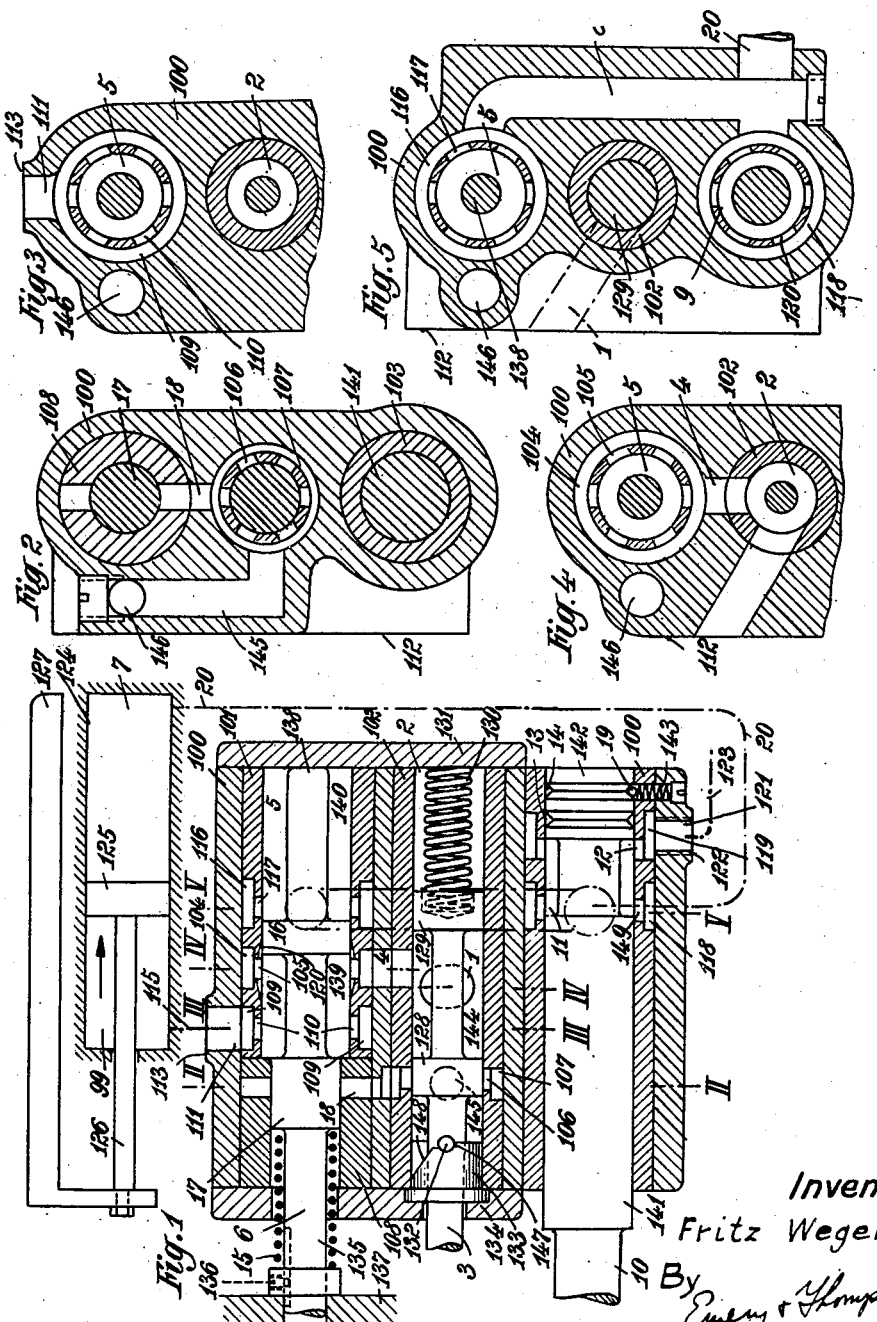
Inventor:
Fritz Wegerdt
By
Emery & Thompson
Attorneys Dec. 12, 1939.     F. WEGERDT     2,182,908
HYDRAULIC DRIVE FOR MACHINE TOOLS
Filed Feb. 26, 1936     7 Sheets-Sheet 2

Inventor:
Fritz Wegerdt
By
Emery Thompson
Bonnekyle Young
Attorneys

Dec. 12, 1939.  F. WEGERDT  2,182,908
HYDRAULIC DRIVE FOR MACHINE TOOLS
Filed Feb. 26, 1936   7 Sheets-Sheet 3
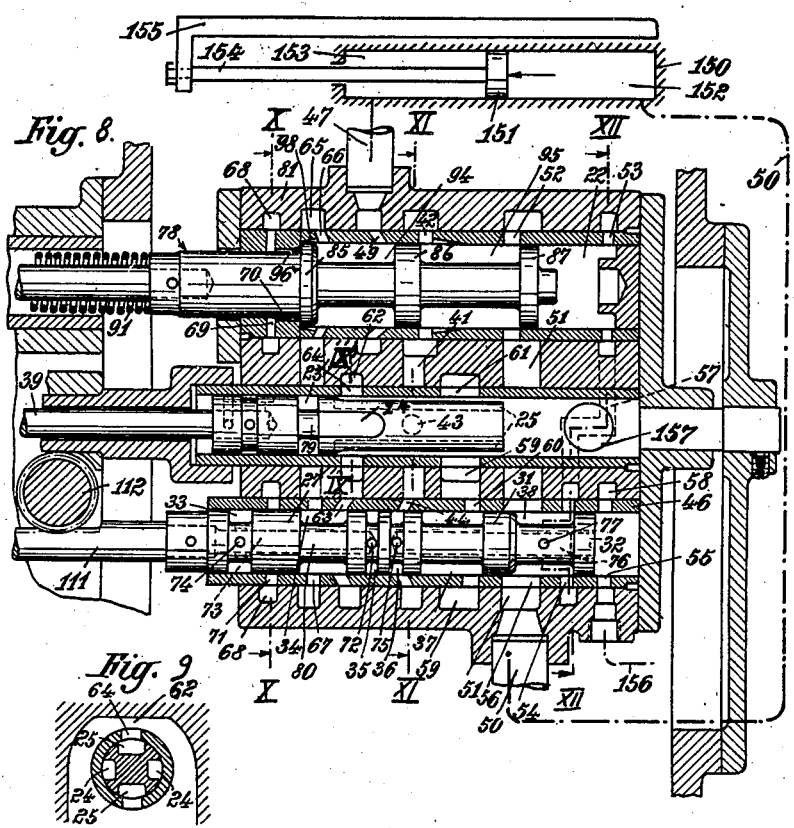
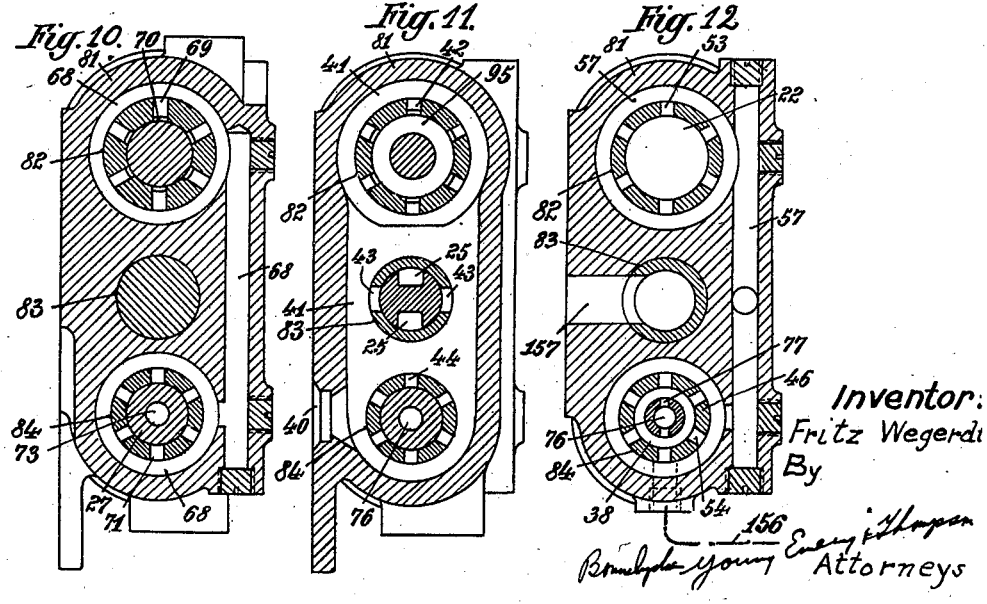
Inventor:
Fritz Wegerdt Dec. 12, 1939.   F. WEGERDT   2,182,908
HYDRAULIC DRIVE FOR MACHINE TOOLS
Filed Feb. 26, 1936   7 Sheets-Sheet 4
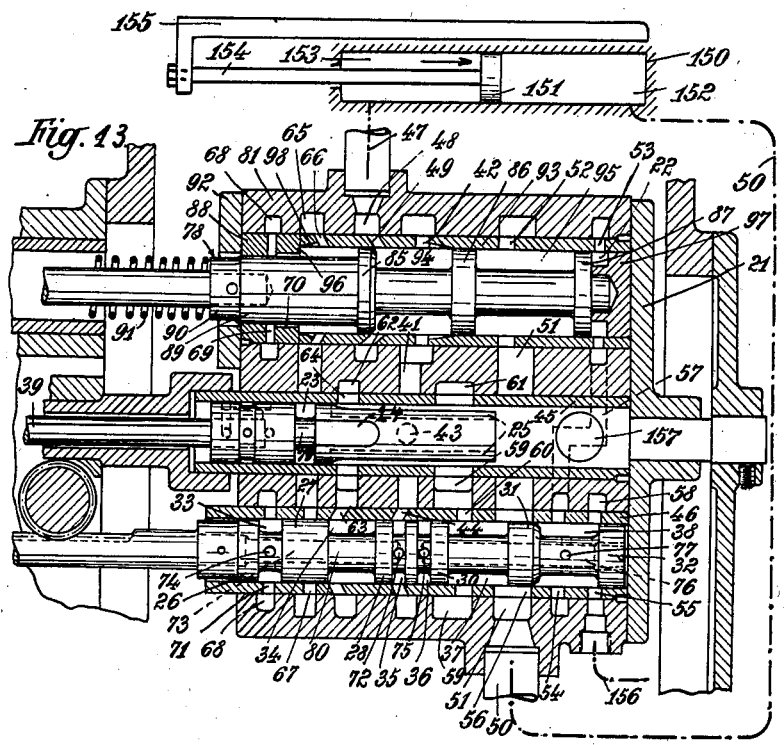
Inventor:
Fritz Wegerdt
By
Attorneys Dec. 12, 1939.  F. WEGERDT  2,182,908
HYDRAULIC DRIVE FOR MACHINE TOOLS
Filed Feb. 26, 1936   7 Sheets-Sheet 5

Inventor:
Fritz Wegerdt
By
Young, Emery & Thompson
Attorneys

Dec. 12, 1939.  F. WEGERDT  2,182,908
HYDRAULIC DRIVE FOR MACHINE TOOLS
Filed Feb. 26, 1936   7 Sheets-Sheet 6

Inventor:
Fritz Wegerdt
By
Bonnelycke Young Emery + Thompson
Attorneys

Dec. 12, 1939.   F. WEGERDT   2,182,908
HYDRAULIC DRIVE FOR MACHINE TOOLS
Filed Feb. 26, 1936   7 Sheets-Sheet 7

Inventor:
Fritz Wegerdt
By
Attorneys

Patented Dec. 12, 1939

2,182,908

UNITED STATES PATENT OFFICE 2,182,908

HYDRAULIC DRIVE FOR MACHINE TOOLS

Fritz Wegerdt, Chemnitz, Germany, assignor to Friedrich Klopp, Solingen-Wald-Khld., Germany Application February 26, 1936, Serial No. 65,896
In Germany March 2, 1935

7 Claims. (Cl. 121—45)

This invention relates to a hydraulic system for machine tools.

In machine tools with a reciprocating tool or element, the reversal of the oil flow could not heretofore be effected in a satisfactory manner, particularly in machines effecting short strokes at high speed. To overcome the dead point action during the reversal, the heretofore known systems have usually employed either auxiliary control valves and an auxiliary pump, or mechanically operating snap-action mechanisms. Both these means are very complicated and require a large number of parts which are subject to wear and operate satisfactorily only when they are constructed with great accuracy. At high pressures and strains the use of snap-action mechanisms is excluded as they are not capable of overcoming the dead point action satisfactorily under all conditions.

Auxiliary control valves have the further disadvantage that they do not permit as short strokes as desired of the reciprocatory machine element, particularly at high speed, for the reason that the time required to fill and re-empty the passages and chambers on reversal of the main valve is relatively considerable. Further disadvantages of auxiliary control mechanisms are caused by the length of time required to reverse the main valve and the machine, which time remains constant independently of the working speed of the machine. Thus the greater the working speed of the machine, the greater is the path traversed by its reciprocatory element before its reversal becomes effective, even after the auxiliary valve has been operated by means of a stop on said element in order to initiate the reversal of the main valve. On changing the speed of cut in known systems with auxiliary valves, it will thus be seen that the reversal point of the planing machine is shifted, so that however the stops may be arranged, the shaping action of the machine is unsatisfactory.

The object of the present invention is to provide a hydraulic control for planing and shaping machines and the like by means of which the above mentioned disadvantages can be overcome by simple means, enabling the reciprocatory element of the machine to be controlled rapidly, with precision, and reliably.

According to the present invention the system comprises a conduit extending from one end of the working cylinder to a tank or reservoir for the pressure medium, and which conduit is also connected with one end of the main slide valve, said conduit having disposed therein an auxiliary valve which is operated by the reciprocatory machine tool or table. To reverse the power piston in one of its dead point positions, the auxiliary valve closes the out-flow from one end of the power cylinder and thereby causes the main valve to be moved by entrapped medium against the action of a spring in such a manner that this end of the power cylinder is connected to the pressure supply, and its other end to discharge into a tank. On reversal at the other dead point position the main valve is moved under the action of the spring, after the auxiliary valve has connected the heretofore pressure side of the power cylinder, to the tank. To prevent chattering of the main valve and to reliably hold it in its end position after completion of this movement, without having to use an excessively strong spring, the main valve, the shifting of which controls the end of the power cylinder not connected with the auxiliary valve has two piston heads of different diameter enclosing an annular chamber, and the pressure differential acting on these heads due to the pressure medium in said chamber acts in the same direction as the force of the spring.

When the auxiliary valve, on reversal solely by the pressure of the entrapped pressure medium, has to move longitudinally, it might be under some conditions that no pressure medium can flow away from the end of the cylinder not previously under pressure. Such condition might arise, for example, if the tool or reciprocatory element has encountered a fixed stop so that no further movement takes place. According to the invention, this disadvantage is overcome by the arrangement that the operating chamber of the auxiliary valve wherein entrapped pressure medium acts upon a piston head of this valve to produce reversal thereof, is put in direct communication with the delivery side of the pump as soon as this chamber is closed against outflow.

A further feature of the invention consists in providing near those edges of the main valve which control the supply of the pressure medium to the return stroke end of the power cylinder, a further piston head of similar diameter forming together with the main piston head an annular chamber which maintains a constant volume during movement of the valve. By these means, as herein described, the discharge from the ends of the power cylinder is so controlled that the discharge from one end is closed when that of the other end is opened, and vice versa. The movement of the auxiliary valve to reverse the power piston from power stroke to return stroke, takes place not by entrapped pressure medium, but by means of a spring. In this manner the power stroke end of the power cylinder is relieved of pressure and its return stroke end placed under pressure, at the same instant, without the power piston being capable of making a further movement due to pressure medium flowing from the unloaded end of the cylinder to the auxiliary valve. The particularly important reversal from power stroke to return stroke thus takes place always at the same point independently of the speed of movement.

To assist the operation of the spring at the reversal from power stroke to return stroke of the power piston, and to prevent chattering of the auxiliary valve, without allowing pressure medium to discharge from the closed discharge conduit of the return stroke side, and thus produce an undesired movement of the working piston, a piston head of the main valve is directly acted upon by the pressure medium in the same direction as the action of the spring, as soon as the discharge is opened from the power stroke end of the power cylinder.

Other improvements and arrangements according to the invention are shown in the accompanying drawings as hereinafter described.

The accompanying drawings show two constructional examples according to the invention, in simplified form.

Figure 1 is a longitudinal section through the control device according to the first example and a diagrammatic longitudinal section through the working cylinder, the parts being in positions corresponding to movement of the working piston in the direction of the arrow.

Fig. 2 is a cross section through the control device taken on line 2—2 of Fig. 1.

Fig. 3 is a part section through the control device taken on line 3—3 of Fig. 1.

Fig. 4 is a part section through the control device taken on line 4—4 of Fig. 1.

Fig. 5 is a cross sectional view of the control device taken on line 5—5 of Fig. 1.

Fig. 8 is a longitudinal section through the system according to the second example, with the parts in position for movement of the working piston in the direction of the arrow.

Fig. 9 is a partial section on the line XI—XI of Fig. 8.

Fig. 10 is a section on the line X—X of Fig. 8.

Fig. 11 is a section on the line XI—XI of Fig. 8.

Fig. 12 is a section on the line XII—XII of Fig. 8.

Figs. 13, 14 and 15 are views similar to Fig. 8, the parts being in positions for piston movement.

Figure 6:
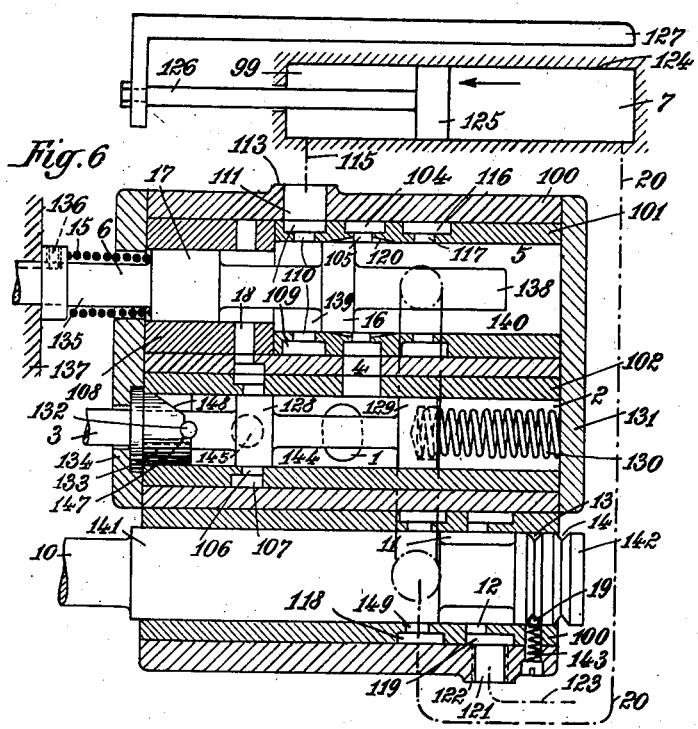
Fig. 6 is a view corresponding to Fig. 1 with the parts in position corresponding to movement of the working piston in the direction contrary to the arrow, Fig. 1.

The control device shown in Figs. 1–7 consists essentially of the three slide valves 10, 3 and 6 of which the middle valve 3 serves for engaging and disengaging the machine and is not operated during normal drive. The three valves are arranged in a housing 100, one face 112 of which is conveniently directly mounted on the pump not shown in order to shorten the passages between the latter and the control device. The housing 100 is provided with three adjacent bores 5, 2 and 9 in which are inserted guide sleeves 101—108, 102 and 103. While the bores of the two sleeves 102 and 103 have the same diameter over their whole length, the bore for the sleeve 108 has a smaller diameter than that of the sleeve 101 so that these two sleeves form a step or shoulder in the bore 5.

Near the middle of the bore 2 there is located a conduit 1 leading to the delivery side of the pump. At about the same radial plane this bore is connected by a port 4 with an annular channel 104 in the sleeve 24, which is connected through slots 105 with the bore 5.

The sleeve 102 is also provided with an annular channel 107 communicating through slots 106 with the bore 2. The bore 5 is connected by a passage 18 provided in the sleeve 108 and in the control housing 100 to the annular channel 107. This channel 107 also communicates through a port 145 and a boring 146, in a manner not shown, with the discharge tank.

Between the annular channel 104 and the slots 105 in the sleeve 101, and the passage 18 in the sleeve 108, a further annular channel 109 is provided in the sleeve 101, which channel communicates with the bore 5 through slots 110. To the annular channel 109 there is connected a conduit 111 formed in the housing 100 and terminated in a connection face 113 to which is attached a pipe 115 indicated in dotted lines in the drawings.

While the annular channel 109 with the slots 110 is located on the one side of the annular channel 104, a further annular channel 116 is provided in the sleeve 101 on the other side of the channel 104 which channel 116 is connected through slots 117 with the bore 5.

In the sleeve 103 of the bore 9 there is provided an annular channel 118 connected by slots 149 with the bore 9. This channel 118 is connected with the annular channel 116 of the sleeve 101 through a conduit 8 in the housing 100; it is convenient to arrange the channel 118 with the slots 149, and the channel 116 with the slots 117, in approximately the same radial plane. Adjacent the annular channel 118 there is provided in the sleeve 103 a further annular channel 119 also connected by slots 12 to the bore 9. On the outside of the housing 100 there is arranged a connection face 123, connected through a passage 121 with the annular channel 119 and also connected to a pipe 123 designated by a chain dotted line, leading to the oil reservoir or tank, not shown.

Figure 7:
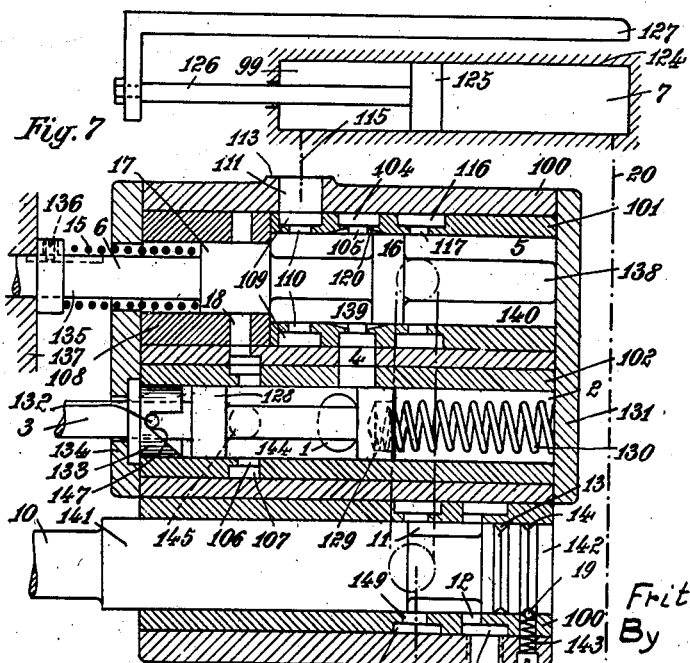
Fig. 7 is a similar view but with the parts in a further position wherein the pump is in direct communication with the tank and no force acts on the working piston.

In the conduit 8 there terminates as shown in Fig. 5 a pipe 20 the further course of which is indicated in Figs. 1, 6 and 7 by a chain dotted line. Through this pipe 20, and the pipe 115 coming from the annular channel 109, the power cylinder 124 of the machine is operated. In this cylinder a piston 125 is longitudinally movably connected in known manner by a piston rod 126 to the machine tool element 127, for example the ram of a shaping machine, or the work table of a planing machine. Usually, as shown, the piston rod extends through the cylinder at one end only, so that the two working chambers 7 and 99 which are fully separated from each other by the piston, have different cross sectional areas. The chamber 7 of the greater cross section is then used for the working stroke of the machine and the chamber 99 of smaller cross section is operative during the return stroke. For this reason in the following description the cylinder end 7 is referred to as the working end, and the cylinder end 99 as the return end.

In the example illustrated the pipe 115 is connected with the return end 99 and the pipe 20 is connected with the working end 7. The connections, however, may be reversed without departing from the invention. On the control valve 3, which is slidable longitudinally and rotatable in the sleeve 102 of the middle bore 2, are provided two piston heads 128 and 129 forming between them an annular space 144. A spring 130 abutting at one end against a cover 131 and at the other against the head 129, constantly urges the valve 3 to its extreme left hand position in which a pin 132 on this piston head bears agaisnt a stuffing box 133 fixed in any suitable manner to a cover 134 attached to the housing 100. The stuffing box 133 serves a bearing for the stem of the valve 3 which extends through said box and is connected to a device, not shown, by means of which the valve can be operated to a small extent. The end of the box 133 facing the piston head 128 has a notch 147 and a tapering surface 148.

In the sleeves 101 and 108 of the bore 5 there is arranged a longitudinal slidable main valve 6 by means of which the piston 125 of the working cylinder 124 is actuated.

The main valve 6 has two pistons 16 and 17 of which the piston head 17 is of smaller diameter and slides in the sleeve 108, while the piston head 16 of larger diameter slides in the sleeve 101. The slots 105 through which the annular channel 104 is connected with the bore of the sleeve 101 have, as shown at 120 inclined surfaces in the contact surface of the sleeve, the slots 105 including these inclined surfaces being wider than piston 16. On the exterior end of the rod 135 of the valve 6 there is provided a helical spring 15 having one end abutting against the left end of the head 17 and the other end against a collar 136 which is slidably arranged on the rod 135 and bears against a part 137 fixed in any suitable manner to the housing 100. The valve 6 is held in its extreme right hand position by means of a rod shaped extension 138 on the piston head 16, which rod bears against the cover 131 which closes the right hand end both of the bore 5 and of the bore 2. The annular space between the heads 16 and 17 is designated 139 and the space between the head 16 and the cover 139 is designated 140.

In the sleeve 103 of the bore 9 the slide valve 10 is longitudinally movable and as this valve assists to control the movement of the main valve 6, it is designated as an auxiliary valve. It consists essentially of a long piston head 141 and a shorter piston head 142 connected thereto between which an annular space 11 is formed. The shorter piston head 142 has two annular grooves 13 and 14 at a certain distance apart, for cooperating with a ball 19 pressed by a spring 143.

The apparatus operates in the following manner. During normal operation shown in Figs. 1 and 6, the valve 3 is held by the spring 130 in the position illustrated. In Fig. 1 the two valves 6 and 10 are shown in the position in which the return end 99 of the working cylinder 124 receives the pressure medium delivered by the pump. The pump delivers through the channel 1, the annular space 144 between the piston heads 128 and 129 of the valve 3, the port 4, the annular channel 104 and the slots 105, into the annular channel 139 between the piston heads 16 and 17 of the main valve 6. From there the pressure medium flows through the slots 110, the annular channel 109, the passage 111 and the pipe 115 to the return side 99 of the working cylinder 124 whereby the piston 125 is moved to the right, Fig. 1, as shown by the arrow. The pressure medium expelled from the working end 7 flows through the pipe 20, a part of the conduit 8, see Fig. 5, the annular channel 118 and slots 149, into the annular chamber 11 of the auxiliary valve 10. From there it flows through the slots 12 into the annular channel 119, and thence through the bore 121 to the pipe 123 and the discharge tank.

Meanwhile the working end 7 of the power cylinder is connected through the pipe 20, the conduit 8, the annular channel 116 and the slots 117, see Fig. 6, with the space 140 at the right of the piston head 16 of the main valve 6. Since the piston head 16 is larger than the piston head 17 the valve 6 is forced to the right hand position shown, in a steady and reliable manner due to the force corresponding to the surplus annular area. This can be assisted by means of the spring 15 which is provided with a certain initial tension operative in this position.

The moving of the piston 125 from the right hand end 7 of the cylinder takes place as follows. The auxiliary valve 10 is moved, at the end positions of the tool or of the work table, by means of the usual stops, or dogs, shown for instance in applicant's co-pending application Serial No. 159,952, filed August 19, 1937, on the tool or work table, acting through suitable transmission means. These stops should be adjustable in order that the length and the position of the working stroke of the machine can be varied. When the working piston 125 located in the right hand end position is to be shifted the auxiliary valve 10 is moved to the right so that the spring ball 19 engages the annular groove 13 of the piston head 142. The piston head 141 of the auxiliary valve 10 in this position covers the slots 149 of the sleeve 103, so that the annular channel 118 and therefore the conduit 8 no longer communicate with the annular space 11 of the auxiliary valve 10. The discharge from the working end 7 of the power cylinder is consequently no longer connected to the discharge tank. Since at this instant there is no discharge effective for the working end 7 of the power cylinder, the liquid in this end is under pressure since as hereinbefore described the delivery side of the pump is connected with the return end 99 of the power cylinder 124 and hence the left hand face of the power piston 125 is under the delivery pressure of the working medium. The increasing pressure thus produced in the working end 7 is transmitted through the pipe 20, the conduit 8, the annular channel 116 and the slots 117 to the space 140 at the right of the piston head 16 of the main valve 6. Under the influence of this pressure the control valve 6 is pushed to the left against the action of the spring 15, because the pressure entrapped in the space 140 acts on the total area of the piston head 16 whereas the pressure liquid in the space 139 which is directly connected with the delivery side of the pump operates on the annular area of the control valve 6 and the area of the piston head 16 is greater than that of the piston head 17.

To the extent that pressure medium is transferred from the working end 7 of the cylinder into the space 140 and consequently thrusts control valve 6 to the left, the working piston 125 will advance a small amount to the right.

As soon as in this manner the right hand edge of the piston head 16 has moved beyond the right hand edge of the oblique surface 120 of the slots 105 the delivery side of the pump is connected through the passage 1, the annular chamber 144, and the port 4, to both the space 139 and the space 140 of the main valve cylinder. Meanwhile the valve 6 continues to move to the left because the area of the piston head 16 is greater than that of the piston head 17. At the instant, or shortly after, that the piston head 16 covers the left hand oblique surface 120 and thus shuts off the annular space 139 from the slots 105, the right hand edge of the piston head 17 uncovers the connection between the port 18 and the annular space 139. The return end 99 of the power cylinder 124 is then connected through the pipe 115 and the passage 111, the annular channel 109, the slots 110, the space 139, the port 18, the annular channel 107 and the passages 145 and 146, with the discharge tank. The pressure of the pump now acting upon the whole area of the piston head 16 of the valve 6, first presses the valve as shown in Fig. 6 against the action of the spring 15 into its left hand position and subsequently begins to shift the power piston 125 to the left in the direction opposite to its previous movement. Meanwhile the liquid pump, delivers through the inlet passage 1, the annular space 144, the port 4 with the slots 105, as shown in Fig. 6, into the space 140 at the right of the piston head 16 of the main valve 6, and from there through the slots 117, the annular channel 116, the conduit 8 and the pipe 20 to the working end 7 of the power cylinder 124 whereby the piston 125 is moved to the left.

When the piston 125 in its left hand end position is to be reversed, the valve 10 is pushed to the left by means of the reciprocating tool of the work table as previously described in such a manner that it again comes into the position shown in Fig. 1 with the spring pressed ball 19 engaging the annular groove 14.

In this manner the annular space 11 of the auxiliary valve 10 is connected through the slots 12, the annular channel 119, the passage 121, and the pipe 123 with the discharge tank so that the pump delivers the working medium through the passage 1, the annular space 144, the port 4, the annular space 140, the slots 117, the annular channel 116, the conduit 8, the annular space 118 and the slots 149, into the annular space 11 and from there into the discharge.

Since at this instant the return end 99 of the power cylinder 124 is also in communication with the discharge tank as previously described, the power piston 125 remains stationary at the instant when with the aid of the piston 141 the working end 21 of the power cylinder 47 is connected with the discharge tank. The pressure medium no longer exerts any force on the main valve 6 so that it is pushed to the right by the spring 15. About the instant when the right hand edge of the piston 17 covers the port 18, the left hand edge of the piston begins to open the left hand inclined end surface 120 of the slots 105. The connection of the annular space 62 with the discharge tank is thus interrupted and the annular space 62, as the piston head 16 moves to the right under the action of the spring 15, is gradually connected with the delivery side of the pump through the passage 1, the annular space 144, the port 4, the annular channel 104, and the slots 105. The pressure in the annular space 139 rises and is transmitted through the slots 110, the annular channel 109, the passage 111 and the pipe 115 to the return end of the power cylinder so that the piston 125 is reversed and now moves oppositely to its previous right hand movement.

If the machine is to be stopped the control valve 3, as shown in Fig. 6, is turned a certain amount and at the beginning of this movement is simultaneously pushed against the action of the spring 130. This lifts the pin 132 out of the notch 147 and the pin 132 slides under the influence of the spring 130 along the oblique surface 148 so that the valve 3 is shifted to the left and its head 128 covers the passage 145 and in this manner by means of the annular space 144 of the inlet passage 1, the pump is directly connected with the channel 145 and hence with the discharge tank so that no power is exerted on the power piston 125.

Figure 14:
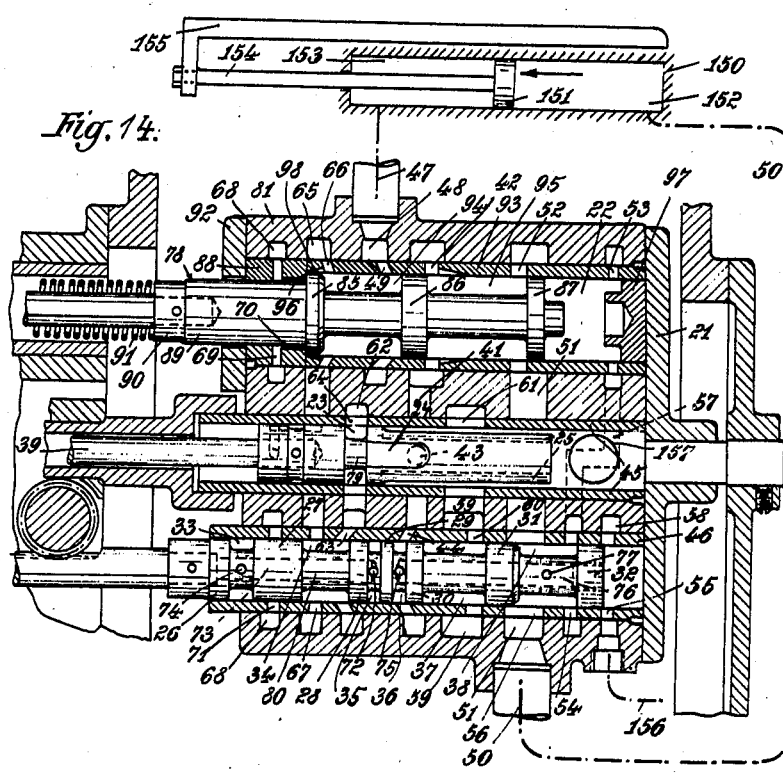
Figure 15:
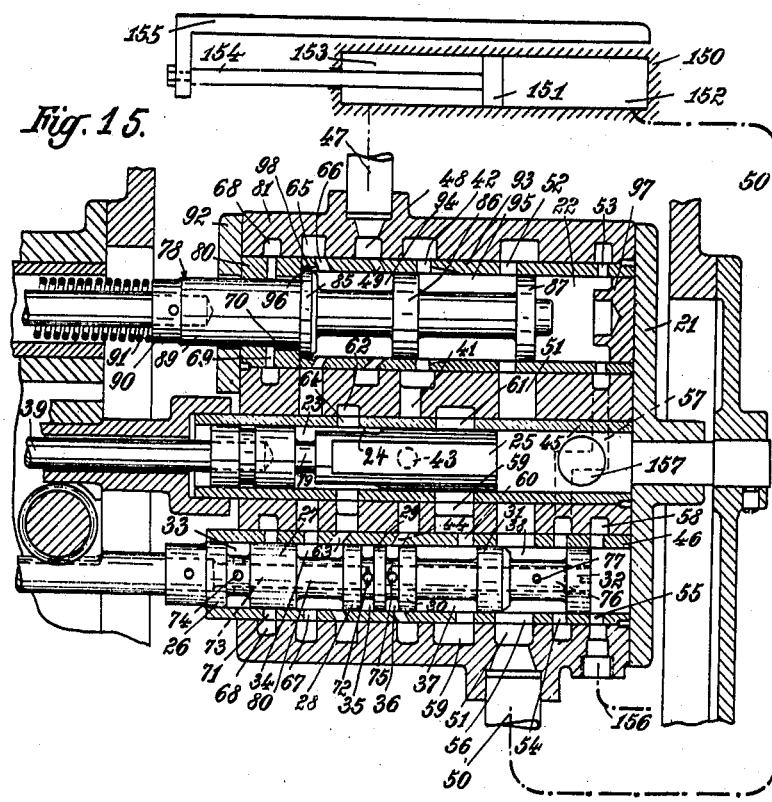

Also the control device shown in the Figs. 8 to 15 is equipped with three slide valves, namely the main valve 78, by means of which the working cylinder is reversed, the control valve 79, which serves for engaging and disengaging the machine tool, as hereinafter described in connection with Fig. 15, and the auxiliary valve 80, which controls the main valve 78 and which can be moved by means of a stop-actuated control shaft. The drive of the auxiliary valve 80 is known and is therefore not nearer described.

In the casing 81 of these valves three mutually parallel bores are formed, which are lines with bushes. In the bore 82 the main valve 78 is slidably arranged and the valves 79 and 80 are arranged in similar manner in the bores 83 and 84 respectively.

The main valve 78 is equipped with three piston heads 85, 86, 87; between which the body of the valve is reduced, so that annual chambers are formed. On the outwardly facing side of the piston head 85 the main valve 78 has an elongation in the form of a shaft 89. 91 denotes a spiral spring, the one end of which engages the outer end 90 of the shaft 89, whilst the other end is seated on some member which is rapidly connected to the casing. The piston heads 85, 86, 87 are all of the same diameter, whilst the shaft like elongation 89 is of a somewhat reduced diameter. At the left end of the bore 82 a guide member 88 is arranged, which is pressed against the outer end of the bush 93 by means of a cover 92.

94 denotes the annual space between the piston heads 85 and 86, and 95 denotes the annular space between the piston heads 86 and 87. Between the outer side of the head 85 and the guide member 88 an annular space 96 is shown, the volume of which changes with the position of the main valve. The other side of the bore 82 is closed by a member 97 and a cover 21. Between the outer side of the head 87 and the member 97 a hollow space is shown, the volume of which changes with the position of the valve 78.

In the control valve 79, which is located in the bore 83 and serves for engaging and disengaging the machine, an annular groove 23 is formed (Figs. 8 and 9), from which two short longitudinal grooves 24 extend. Perpendicularly to the grooves 24 also two longitudinal grooves 25 are formed which extend from the right hand end of the control valve to a point near the groove 23. Both ends of the bore 83 are closed by some suitable means. The valve 79 can be rotated and moved in the longitudinal direction by means of an outwardly projecting rod 39.

The auxiliary or reversing valve 80, which can be moved in axial direction in the bore 84, is equipped with seven piston heads, 26, 27, 28, 29, 30, 31 and 32 of equal diameter, between which annular spaces 33, 34, 35, 36, 37 and 38 are formed. The left end of the bore 84 is closed by the piston head 26, and the right end by a cover 21.

As it will be seen, particularly from Fig. 11, the pressure fluid from the delivery side of the pressure fluid pump enters the casing 81 through an opening 40, which communicates with the three bores 82, 83 and 84 through a channel 41 in the casing 81. The bore 82 communicates with the channel 41 through slots 42 in the bush 93, and the bore 83 communicates with the channel 41 through a bore in the bush 45 or through two bores 43 arranged diametrically opposite each other in the bush 45. Slots 44 in the bush 46 form a connection between the channel 41 and the interior of the bore 84.

The system serves to control the oil supply of a hydraulically driven reciprocatory tool or element of a machine tool indicated diagrammatically in Figs. 8, 13 and 14. In the example illustrated it is assumed that the machine is a shaping machine. On the machine frame is fixed a power cylinder 150 in which a piston 151 is longitudinally slidable. The piston has a rod 154 connecting it rigidly to the ram 155 of the shaping machine, in which the shaping tool is mounted in well known manner. The cylinder chamber at the right hand of the piston 151 is designated 152, and the chamber to the left of the piston is designated 153, the effective piston area in this chamber being less than the piston area in chamber 152, by the cross-sectional area of the piston rod 154. The arrangement is such that when pressure medium operates in the chamber 152 in which the piston area is greater, the ram is moved forwardly to effect its working stroke and make a cut with the tool. The cylinder chamber 153 is used for the return stroke of the ram 155. For simplicity the chamber 152 is herein designated as the right or working chamber, and the chamber 153 as the left or return chamber.

The return chamber 153 is connected through a conduit 47 with a channel 48 surrounding the bore 82, which channel communicates through ports 49 with the interior of the bores 82. The right-hand chamber 152 is connected by a conduit 50 with a port 51 which connects three bores 82, 83 and 84 with each other. In the region of the port 51 the sleeve 45 of the bore 83 is provided with no slots while the port 51 is connected by slots 52 with the interior of the bore 82, and by slots 56 with the interior of the bore 84. The right-hand end of the interior of the bore 84 is also connected through a conduit 57 with the right-hand end of the bore 82, and through a passage 58 with a pipe 156 indicated in Figs. 8, 13, 14 and 15 by a chain dotted line going to the tank, not shown. In the sleeves 93 and 46 are provided slots 53, 54 and 55 as shown, for the above mentioned purpose.

Between the encircling channels 41 and 51 a channel 59 is formed, which communicates with the bore 84 through slots 60 and with the bore 83 through slots 61. In the same manner is on the left side of the channel 41 a channel 62 formed, which communicates with the bore 84 through slots 63 and with the bore 83 through slots 64.

Adjacent the outer left end of the bush 93 of the main control slide 78 a groove 65 is formed which surrounds the bores 82, 83, 84 and communicates with the bores 82 and 84 through slots 66 and 67 respectively. In the bush 45 of the bore 83, however, no slots are formed in the vicinity of the channel 65. To the left hand side of the channel 65 also a channel 68 is formed, which interconnects the bores 82 and 84. In the guide member 88 radial slots 69 and longitudinal slots 70 are formed, through which the chamber 96 communicates with the channel 68. Slots 71 form a connection between the channel 68 and the bore 84.

The right end of the bore 83 is connected through the bore 157 with the outlet container.

The annular space 35 of the auxiliary valve 80 communicates with the annular space 33 through the transverse bores 72, the longitudinal bore 73 and the transverse bores 74. The annular space 36 communicates with the annular space 38 through the transverse bores 75, the longitudinal bore 76 and the transverse bores 77.

The control device shown in the Figs. 8 to 12 inclusive operates in the following manner:

The return stroke side 153 of the working cylinder 150 having the smaller piston surface communicates with the conduit 47, and the forward stroke side 152 of the working cylinder communicates with the conduit 50. In Figs. 8, 13 and 14 the central control valve 79 is shown in a position it will take up when the machine is running. The pressure fluid from the pump enters the casing 81 of the control device through the opening 40 and flows through the channel 41 and the slots 42 into the annular space 95 of the main valve 78. The pressure fluid thereupon flows into the cylinder, at the right side 152 of the same, through the slots 52, the channel 51 and the conduit 50.

From the channel 51 the pressure fluid also flows through the slots 56 into the annular space of the auxiliary valve 80, from where it flows into the space 22 of the main valve 78 through the slots 54 and the channel 57. Thus, the valve 78 is securely held in its left position against the pressure exerted by the pressure fluid on the right side of the piston.

From the left side 153 of the cylinder 150, which in the described example corresponds with the return stroke of the machine, the pressure fluid flows through the conduit 47, the channel 65 and the slots 67 to the annular space 34 of the auxiliary valve 80. From the space 34 the pressure fluid flows through the slots 63, the channel 62 and the slots 64, and leaves the device through the longitudinal grooves 25, bore 83 and bore 157.

The delivery side of the pressure fluid pump also communicates with the annular space 36 of the auxiliary valve 80 through the channel 41 and the slots 44. The pressure fluid thereupon flows through the transverse bores 75, the longitudinal bore 76 and the transverse bores 77 to the annular space 38. From this space the pressure fluid flows through the slots 54 and the channel 57 into the space 22, from which it acts upon the head 87 of the valve 78.

When the machine is to be reversed, the auxiliary or reversing valve 80 as shown in Fig. 13 is in any of the known manners moved to the right. In the same moment in which the piston head 27 closes the slots 67 in the bush 46, the piston head 31 uncovers the slots 56, whereby the channel 51 is brought into communication with the longitudinal slots 25 of the valve 79 and with the outlet container through the annular space 37, the slots 60, the channel 59 and the slots 61.

The piston head 32 of the auxiliary valve 80 also uncovers the slots 55 and the channel 58 and conduit 156, whereby communication is established between the space 22 and the outlet container through the slots 53, the channel 57, the slots 55 and the annular space 38.

The spring 91 of the valve 78 is no longer opposed by any force and therefore moves the main valve to the right, hereby overcoming the frictional resistance. The spring is assisted in its action by the circumstance, that the annular space 35 of the valve 80, Fig. 13, now communicates with the slots 44 in the bush 46. Through this the delivery side of the pump is over the bores 72, 73 and 74 connected with the space 33, which at this moment is on the level of the slots 71. The pressure fluid will therefore flow through these slots, the channel 68, the radial slots 69 and the longitudinal slots 70 into the annular space 96 and act upon the left side of the piston head 85.

The pressure fluid pump now communicates with the left side 153 of the power cylinder 150 through the channel 41, the slots 42, the space 94, the slots 49 and the conduit 47.

When reversing from rearward stroke to forward stroke the auxiliary valve 80 is again moved into the position shown in Fig. 8. The pressure fluid flowing from the right side 152 of the cylinder 150 through the conduit 50 will accumulate in the channel 51 and the annular space 38, because the slots 60 and the channel 59 are shut off by the piston 31. The pressure of the accumulated fluid is transmitted through the slots 54, the channel 57 and the slots 53 to the space 22 and the main valve 78 is moved to the left against the pressure of the spring 91 by the fluid pressure acting upon the right side of the piston 87. This effect is augmented by the circumstance, that the space 22 as described communicates directly with the delivery side of the pressure fluid pump through the channel 41, slot 44, annular channel 36, bores 75, 76, annular channel 38, slot 54, channel 57, slot 53, and the bore 76.

The bushing 93 is provided with a conical annular groove 98 on the end lying left from the slots 66.

When the main valve 78 moves towards the left end from the position of Fig. 13 to the position of Fig. 8, this movement is gradually retarded as soon as the piston head 85 has covered the slots 66 because the fluid in the chamber 96 can only escape through the conical annular groove 98 which gradually grows narrower in concert with the movement of the piston.

The middle slide valve 79, as shown in Fig. 14, may be moved sufficiently to cause the annular space 23 to register with the slot 64. In this position the space 23 is connected through the short longitudinal grooves 24 with the ports 43 which are in communication with the delivery side of the pump for the pressure medium. In this manner, as will be seen from Fig. 14, the pressure medium flowing out of the left-hand chamber 153 of the power cylinder, when the main valve 78 and the auxiliary valve 80 are in the position shown in Fig. 8, passes through the channel 65, the annular space 34, the channel 62, the slot 64, the annular space 23, and the longitudinal grooves 24, to the delivery side of the pump. On the other hand, when the middle slide valve 79 is in such a position, and the main slide valve 78 and the auxiliary slide valve 80 are in the position shown in Fig. 14, then the operation of the system according to this figure is not changed in any way.

The pump is now connected only to the port 40, the channel 41, the ports 43, the annular space 23, the slot 64, the channel 62 and slot 63, in communication with the annular chamber 34 of the auxiliary slide valve 80, from which the pressure medium cannot escape and thus cannot exert any force on the auxiliary slide valve. Since this position can be readily understood from Figs. 13 and 14 it is not illustrated separately.

In Fig. 15 there is shown the manner in which the machine tool and the working cylinder 150 can be put out of operation. For this purpose the delivery side of the pump is put in direct communication with the tank by turning the middle or control valve 79 through 90° as shown in Fig. 15. The delivery side of the pump is then connected through the port 40, the channel 41, the ports 43, the longitudinal slots 25 in the valve 79, the bore 83 and the bore 157, to the tank, so that no force is exerted on the piston 151 of the working cylinder 150. This action is independent of the position of the main slide valve 78 and auxiliary valve 80. By turning the valve 79 through 90°, the described direct connection of the pump to the tank is produced also in the case when the valve 79 is in the position shown in Fig. 14, prior to the said turning.

Figure 16:
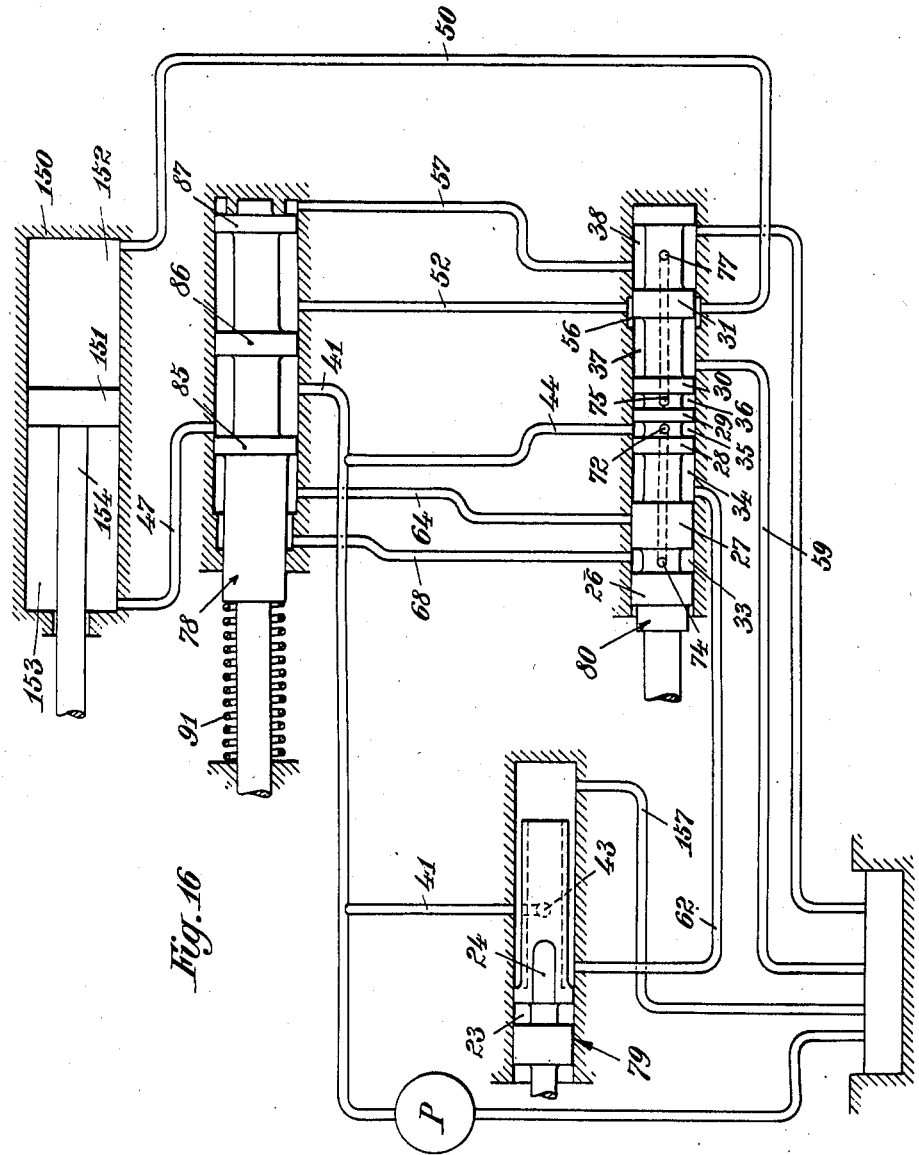
Fig. 16 is a diagrammatic view of a float sheet showing the arrangement of the various valves.

Fig. 16 is a flow sheet in which the various details correspond to the setting of the members as in Fig. 13 except that the slide 79 is shown as moved entirely to the left for a clearer showing.

I claim as my invention:

1. A hydraulic control system for reciprocatory machine tools comprising a power cylinder for operating the machine part to be reciprocated, means for supplying hydraulic medium under pressure, a main valve cylinder, a spring held slide valve therein, having two pistons of different diameters of which the piston of larger diameter and the main valve cylinder form a chamber, means for connecting the chamber with the exhaust from the power cylinder, an auxiliary valve cylinder, a slide valve therein actuated by reversal of the machine part to be reciprocated, and a system of passages and ports for the hydraulic medium and means inter-connecting said power and valve cylinders with the pressure means so that in one position of the auxiliary valve one end of the power cylinder is connected to the pressure means by way of the main valve cylinder and the other end of the power cylinder is connected to an exhaust by way of the auxiliary valve cylinder, and in another position of said auxiliary valve the second mentioned end of the power cylinder is closed until the therein entrapped medium operates the main valve through passages in said system against its spring, said main valve then connecting said second mentioned end of the power cylinder to the pressure means and its other end to the exhaust.

2. A system according to claim 1, in which the main valve having the two piston heads of different diameter form between them an annular chamber in the main valve cylinder, and the spring of the main valve is so arranged that the pressure differential acting on said piston heads due to pressure medium in said chamber is effective in the same direction as the spring.

3. A hydraulic control system for machine tools, comprising a power cylinder having a working piston reciprocable therein, means for supplying a pressure medium, a spring-actuated main valve slidable in a casing, a conduit connecting one end of said power cylinder to said main valve; an auxiliary valve actuated by the reciprocation of the working piston and inserted in said conduit, an exhaust port controlled by said auxiliary valve, pressure responsive means for operating the main valve against said spring, said pressure responsive means being connected to said conduit, a second conduit connecting the other end of the power cylinder to the main valve, a connection between said exhaust port and the first-mentioned conduit, said auxiliary valve controlling said connection, and means actuated by the power piston at the end of its stroke for shifting the auxiliary valve to close the connection between the exhaust port and the first-mentioned conduit and thereby causing the pressure medium in the first-mentioned conduit to actuate the pressure responsive means to shift the main valve.

4. A hydraulic control system for machine tools in accordance with claim 3, in which said pressure responsive means consists of two valve heads of different diameters in the main valve casing.

5. A hydraulic control system for machine tools in accordance with claim 3, in which said pressure responsive means consists of two valve heads of different diameters in the main valve casing and the larger head forming a space with the adjacent end of the main valve casing connected with said first-mentioned conduit.

6. A hydraulic control system for machine tools in accordance with claim 3, in which said pressure responsive means consists of two valve heads of different diameters in the main valve casing and the larger head forming a space with the adjacent end of the main valve casing connected with said first-mentioned conduit, and in which a manually operated control valve is provided having a starting and a stopping position and being provided with a chamber connected with said means for supplying pressure medium and an outlet port from said chamber, whereby, upon setting the control valve to uncover said outlet port permitting the pressure medium to pass out without supplying medium to the power cylinder, the working piston is stopped.

7. A hydraulic control system for machine tools, comprising a power cylinder having a reciprocable piston therein, means for supplying a pressure medium, a set of valves arranged between the power cylinder and said means and comprising a spring actuated main valve slidable in a casing, a control valve having a running and stopping position and an auxiliary valve, means actuated by the power piston for automatically shifting the auxiliary valve at each end of the working piston stroke, said main valve having three heads of equal diameters forming between them two annular spaces in the valve casing of constant volume and forming between the respective ends of the casing and each adjacent head a space of variable volume, said control valve being open to said annular spaces of the main valve, a conduit connecting one end of said power cylinder with one of said variable spaces of the main valve, and a second conduit connecting the other end of said power cylinder with one of the annular spaces of constant volume, said auxiliary valve being inserted in both of said conduits and having connection with an exhaust port and having also connection with said means for supplying pressure medium, whereby the auxiliary valve in one position closes the connection between the exhaust port and said first-mentioned conduit thereby causing the pressure medium in the first-mentioned conduit to act against the heads of the main valve to change its position.

FRITZ WEGERDT.